June 2, 1936.　　　F. R. HOHMANN　　　2,042,526
SHEET GLASS INSPECTION APPARATUS
Filed Sept. 1, 1932

Inventor
FREDERICK R. HOHMANN
By Frank Fraser
Attorney

Patented June 2, 1936

2,042,526

UNITED STATES PATENT OFFICE 2,042,526

SHEET GLASS INSPECTION APPARATUS

Frederick R. Hohmann, Charleston, W. Va., assignor to Libbey-Owens-Ford Glass Company, Toledo, Ohio, a corporation of Ohio Application September 1, 1932, Serial No. 631,363

5 Claims. (Cl. 88—14)

The present invention relates to apparatus for the inspection of sheet or plate glass.

In certain well known processes for producing continuous sheet or plate glass, the continuous sheet or ribbon of glass, after being formed, is carried horizontally through an annealing leer and emerges therefrom onto a so-called capping table upon which it is cut transversely into individual sheet sections.

It has been found that certain defects present in the glass sheet cannot be detected except when the said sheet is held in front of a white or relatively light background. One of these defects consists of amber colored spots in the glass which are termed in the art "smoke". Heretofore, in order to detect "smoke" in the glass, the sheets have been carried from the capping table and placed on edge in front of a white or relatively light background.

The principal aim and object of this invention resides in the provision of an improved apparatus permitting a more rapid and thorough inspection of the glass sheet and with a minimum effort on the part of the inspector.

Another important object of the invention is the provision of a novel form of apparatus embodying an inspection table positioned to receive the glass sheet thereupon from the capping table and so constructed that the glass may be inspected while passing thereover whereby to minimize handling of the glass and permit inspection thereof in an easy and convenient manner.

Other objects and advantages of the invention will become more apparent during the course of the following description when taken in connection with the accompanying drawing.

Figure 1:
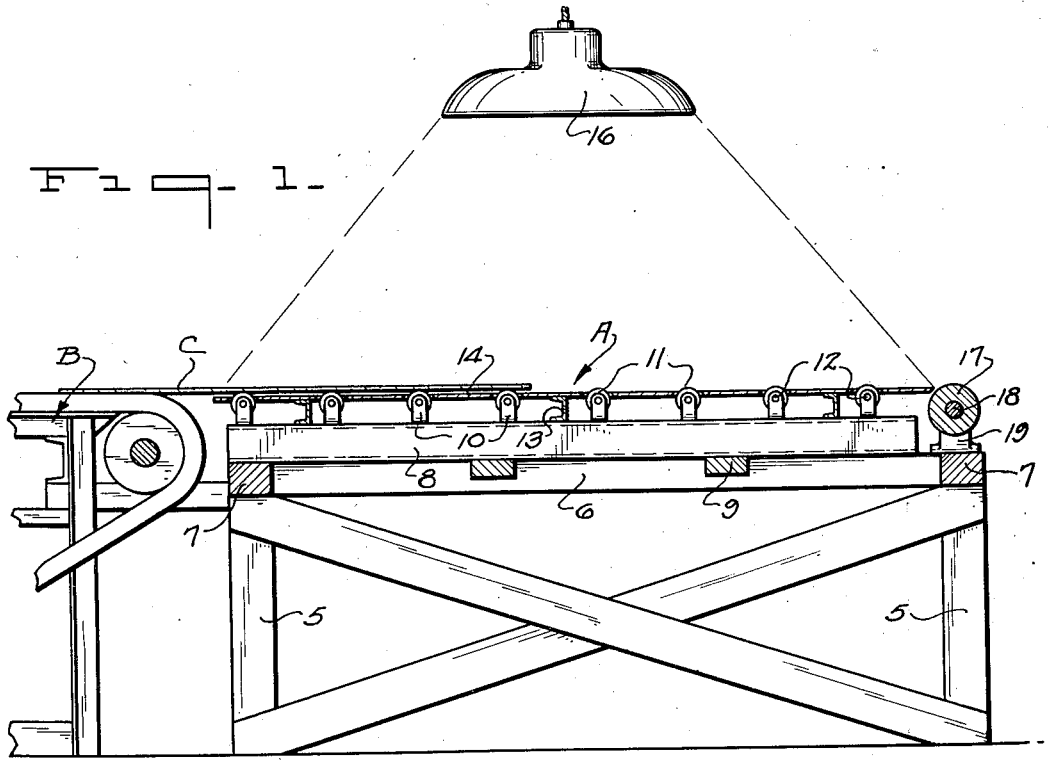
Figure 2:
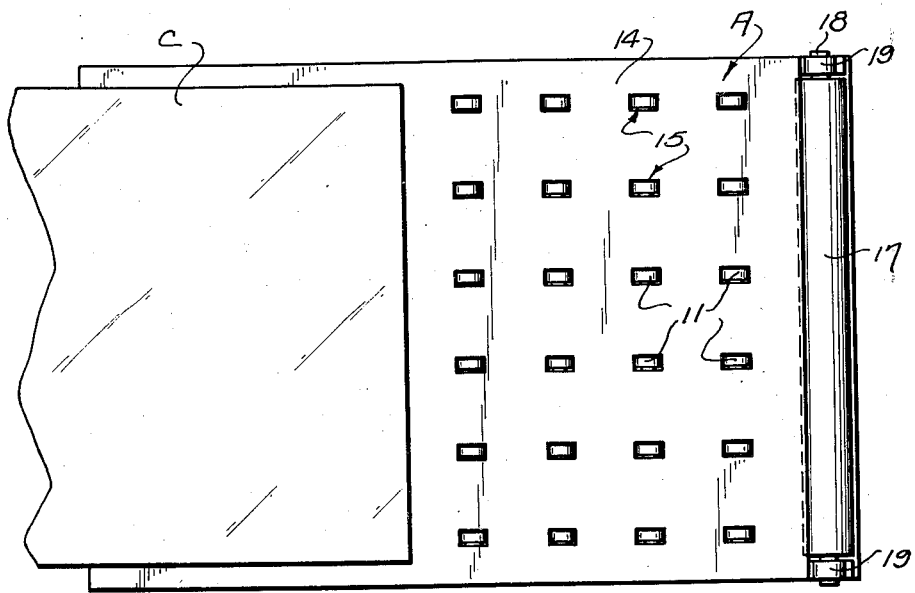

In the drawing forming a part of this application and wherein like numerals are employed to designate like parts throughout the same, Fig. 1 is a vertical longitudinal section through apparatus constructed in accordance with the present invention, and Fig. 2 is a plan view thereof.

Referring now to the drawing, the letter A designates in its entirety the improved glass inspection apparatus forming the subject matter of the present invention. Although this inspection apparatus is not limited to use in connection with any particular type of sheet glass forming or handling apparatus, it has been illustrated by way of example as being positioned relatively closely adjacent the end of a capping or cutting table B for receiving the glass sheet C therefrom.

As pointed out above, in certain processes for producing sheet glass, the capping table is positioned to receive the continuous sheet or ribbon of glass thereupon as it emerges from the annealing leer.

The inspection apparatus A comprises a preferably rectangular table embodying a supporting framework including a plurality of vertical supporting legs 5 connected together at their upper ends by the longitudinally extending side members 6 and the transverse end members 7. Also extending between and connecting the side members 6 intermediate their ends are the cross members 9. Extending longitudinally of the table and supported upon one of the end members 7 and also upon the cross members 9 are a plurality of spaced parallel beams 8. Mounted upon each beam 8 are a series of spaced vertical brackets 10 carrying the rollers 11 freely rotatable upon horizontal pins 12. These rollers are preferably arranged in a plurality of rows extending both longitudinally and transversely of the table, with their axes of rotation extending transversely thereof so that the said rollers function to receive the glass sheet thereupon from the capping table and carry the same forwardly.

Supported upon the longitudinally extending beams 8 are a plurality of cross beams 13, and carried thereby is a horizontal plate 14 preferably, although not necessarily, of metal. This plate is disposed slightly beneath the tops of the rollers 11 and is provided with a plurality of openings 15 through which the upper portions of the said rollers project. The plate 14 is therefore so positioned that it will in no way interfere with the movement of the glass sheet C over the rollers 11. The upper surface of the plate 14 is preferably white although it may be of some other suitable relatively light color and may consist of a coating of the desired color painted or otherwise suitably applied thereto.

Located above the inspection table A is a source of illumination 16 which is adapted to throw light downwardly thereupon in such a manner as to uniformly illuminate the white or relatively light upper surface of plate 14.

In the use of the inspection apparatus described hereinabove, the glass sheet C may be delivered from the capping table B onto the inspection table A where it is supported upon and advanced forwardly over the rollers 11. During the movement of the sheet over the inspection table, it is adapted to be inspected and marked for defects in the customary manner well known in the art, so that the said sheet, upon removal thereof from the inspection table, can be carried directly to the cutting room where it may be cut into a plurality of smaller pieces of glass. The upper surface of the plate 14 which is illuminated by the light thrown downwardly thereupon from the source of illumination 16 constitutes a white or relatively light background in front of which the glass sheet is passed. Therefore, as the glass sheet is moved over the rollers 11, any defects present therein will stand out and be plainly visible against the white or relatively light background afforded by plate 14. This is particularly true of those defects referred to hereinabove as being termed "smoke". As stated, "smoke" consists of amber colored spots in the glass, and obviously these spots will stand out prominently against the white or relatively light background and may be readily detected. As a consequence, the glass sheet can be subjected to a rapid and thorough inspection as it is being passed slowly over the inspection table, which inspection can be accomplished in an easy and convenient manner to the end that handling of the glass may be reduced to a minimum and the inspection operation simplified and expedited.

Carried by the inspection table A at the outer end thereof is a so-called take-off roll 17 upon which the glass sheet is permitted to rest during the removal thereof from said table. This roll is here shown as being mounted upon a shaft 18 rotatably supported at its opposite ends in bearings 19.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In an inspection apparatus for transparent sheet or plate glass, a table including a plurality of rollers for supporting the sheet horizontally thereupon, a horizontal plate carried by the table and disposed beneath the glass sheet supported thereon, said plate having a plurality of openings therein through which the upper portions of said rollers project, the upper surface of said plate constituting a relatively light background, and an inspection lamp arranged above the table and positioned to throw light downwardly over substantially the entire area thereof, said light passing through the transparent glass sheet and illuminating the relatively light background.

2. In an inspection apparatus for transparent sheet or plate glass, a table including a plurality of freely rotatable rollers arranged in a plurality of rows extending both transversely and longitudinally of the table and adapted to support the glass sheet horizontally thereupon, a horizontal plate carried by the table and disposed slightly beneath the tops of said rollers, said plate substantially closing the spaces between the rollers and having openings therein through which the upper portions of said rollers project, the upper surface of said plate constituting a relatively light background, and a source of illumination arranged above the table for throwing light downwardly thereupon to illuminate said background.

3. In an inspection apparatus for transparent sheet or plate glass, a table including a plurality of rollers for supporting the sheet horizontally thereupon, a horizontal plate carried by the table and disposed beneath the glass sheet supported thereon, said plate having a plurality of openings therein through which the upper portions of said rollers project, the upper surface of said plate being white, and an inspection lamp arranged above the table and positioned to throw light downwardly over substantially the entire area thereof, said light passing through the transparent glass sheet and illuminating the white upper surface of said plate.

4. In an inspection apparatus for transparent sheet or plate glass, a table including a plurality of rotatable rollers arranged in a plurality of rows extending both transversely and longitudinally of the table and adapted to support the glass sheet horizontally thereupon, a horizontal plate carried by the table and disposed slightly beneath the tops of said rollers, said plate substantially closing the spaces between the rollers and having openings therein through which the upper portions of said rollers project, the upper surface of said plate constituting a relatively light background, and a source of illumination arranged above said table and positioned to throw light downwardly over substantially the entire area thereof, said light passing through the transparent glass sheet and illuminating the relatively light background.

5. In an inspection apparatus for transparent sheet or plate glass, a table including a plurality of rollers for supporting the sheet horizontally thereupon, a horizontal plate carried by the table and disposed beneath the glass sheet supported thereon, said plate having a plurality of openings therein through which the upper portions of said rollers project, the upper surface of said plate being of a color which contrasts with the defects in the glass sheet, and an inspection lamp arranged above the table and positioned to throw light downwardly thereupon, said light passing through the transparent glass sheet and upon the upper surface of said plate.

FREDERICK R. HOHMANN.